US009122791B2

(12) United States Patent
Burghard et al.

(10) Patent No.: US 9,122,791 B2
(45) Date of Patent: Sep. 1, 2015

(54) IDENTIFYING A STORAGE LOCATION FOR A STORAGE ADDRESS REQUESTED DURING DEBUGGING

(71) Applicant: International Business Machines Corporation, Armonk, NY (US)

(72) Inventors: Stephen J. Burghard, Portsmouth (GB); David J. Harman, Eastleigh (GB); Mark A. Woolley, Winchester (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 13/785,615

(22) Filed: Mar. 5, 2013

(65) Prior Publication Data

US 2014/0258785 A1    Sep. 11, 2014

(51) Int. Cl.
*G06F 11/00* (2006.01)
*G06F 11/36* (2006.01)

(52) U.S. Cl.
CPC ..................... *G06F 11/362* (2013.01)

(58) Field of Classification Search
CPC .............. G11C 16/0425; G06F 11/362; G06F 11/3664; G06F 11/3652; G06F 11/3648
USPC ............ 714/30, 38.11; 717/124, 127; 703/28; 710/110
See application file for complete search history.

(56) References Cited

U.S. PATENT DOCUMENTS

| | | | | | |
|---|---|---|---|---|---|
| 4,953,084 | A | * | 8/1990 | Meloy et al. | 717/131 |
| 5,386,522 | A | * | 1/1995 | Evans | 717/124 |
| 5,713,010 | A | * | 1/1998 | Buzbee et al. | 717/124 |
| 6,430,707 | B1 | * | 8/2002 | Matthews et al. | 714/37 |
| 6,550,056 | B1 | * | 4/2003 | Mizumoto et al. | 717/124 |
| 7,318,174 | B2 | | 1/2008 | Lewis | |
| 7,975,183 | B2 | | 7/2011 | Xu et al. | |
| 8,201,151 | B2 | | 6/2012 | Barker et al. | |
| 8,762,779 | B2 | * | 6/2014 | Gaskins et al. | 714/30 |
| 8,812,289 | B1 | * | 8/2014 | Chan et al. | 703/28 |
| 2002/0007430 | A1 | * | 1/2002 | Kawasaki et al. | 710/110 |
| 2003/0142550 | A1 | * | 7/2003 | Kawahara et al. | 365/185.28 |
| 2004/0103175 | A1 | * | 5/2004 | Rothman et al. | 709/222 |

(Continued)

FOREIGN PATENT DOCUMENTS

JP        2010204934 A        9/2010

OTHER PUBLICATIONS

Allen Systems Group Inc., "ASG Software Soultions—ASG-Smart-Test/CICS for Testing and Debugging in CICS" asg.com [online], [retrieved on Jan. 2, 2013]. Retrieved from the Internet <URL: http://www.asg.com/Products/View/ASG-Existing-Systems-Workbench-%28ESW-%29-Suite/ASG-SmartTest-CICS.aspx>.

*Primary Examiner* — Bryce Bonzo
*Assistant Examiner* — Jeison C Arcos
(74) *Attorney, Agent, or Firm* — Maeve McCarthy

(57) ABSTRACT

A method for identifying a storage location for a requested storage address. The method includes receiving a request to view data at a storage address and determining the requested storage address corresponding to a plurality of storage locations. The method includes determining whether the requested storage address identifies memory related to a dump file being analyzed by a dump formatter. Then, in response to determining the requested storage address identifies memory related to the dump file being analyzed by the dump formatter, the method includes identifying one of the plurality of storage locations. The method includes directing the request to the identified storage location.

17 Claims, 3 Drawing Sheets

(56) References Cited

U.S. PATENT DOCUMENTS

| | | | |
|---|---|---|---|
| 2006/0248391 A1* | 11/2006 | Glover et al. | 714/30 |
| 2007/0130231 A1* | 6/2007 | Brown et al. | 707/204 |
| 2007/0207800 A1* | 9/2007 | Daley et al. | 455/425 |
| 2008/0222612 A1* | 9/2008 | Glotzbach et al. | 717/127 |
| 2008/0295077 A1* | 11/2008 | Sengupta et al. | 717/124 |
| 2010/0174948 A1* | 7/2010 | Glotzbach et al. | 714/38 |
| 2011/0271152 A1 | 11/2011 | Hattori et al. | |
| 2012/0072791 A1 | 3/2012 | Kim et al. | |
| 2012/0173919 A1* | 7/2012 | Patel et al. | 714/4.11 |

* cited by examiner

IDENTIFYING A STORAGE LOCATION FOR A STORAGE ADDRESS REQUESTED DURING DEBUGGING

FIELD OF THE INVENTION

The present invention relates generally to the field of software debuggers, and more particularly to identifying a storage location for a storage address requested during debugging.

BACKGROUND OF THE INVENTION

In software support, a customer will often provide evidence of a software problem in the form of output provided by the computer program itself, called "dump files." Dump files contain the recorded state of the working memory of a computer program at a specific time, generally when the program has crashed, and are used to assist in diagnosing errors in computer programs. Dump files can include reports of the problem, recent activity, and the current state of the computer at the time the problem occurred. Dump files allow a computer program to be analyzed without monopolizing the operating system and can be used to retrieve information from a no longer running program. Dump files are written in machine code, which can be converted into a readable form by dump formatters to allow service engineers to determine a cause of, and potentially a solution to, the customer's problem.

In addition to reviewing dump files, service engineers and software developers also use debugging software to study the computer program's behavior in detail. One example of debugging software is a source level debugger (SLD), which allows the service engineer or software developer to analyze line by line the problem source code. Debugging software can be used to debug dump formatters, either in the case of a customer problem or during the debugging of new code. When a dump formatter converts a dump file into readable form, the dump file itself is loaded into the dump formatter's memory. As a dump formatter is executed, the service engineer or software developer may want to browse specific memory locations or modify stored values. The dump file contains storage addresses, which are used to locate specific parts of memory. However, the dump formatter's memory locations are different to the memory locations where the contents were originally held for use by the computer program.

SUMMARY

Embodiments of the present invention disclose a method, computer program product, and computer system for identifying a storage location for a requested storage address. The method includes receiving a request to view data at a storage address and determining, by one or more computer processors, the requested storage address corresponding to a plurality of storage locations. The method includes determining whether the requested storage address identifies memory related to a dump file being analyzed by a dump formatter and in response to determining the requested storage address identifies memory related to the dump file being analyzed by the dump formatter, identifying one of the plurality of storage locations. The method then includes directing the request to the identified storage location.

DETAILED DESCRIPTION

Figure 1:
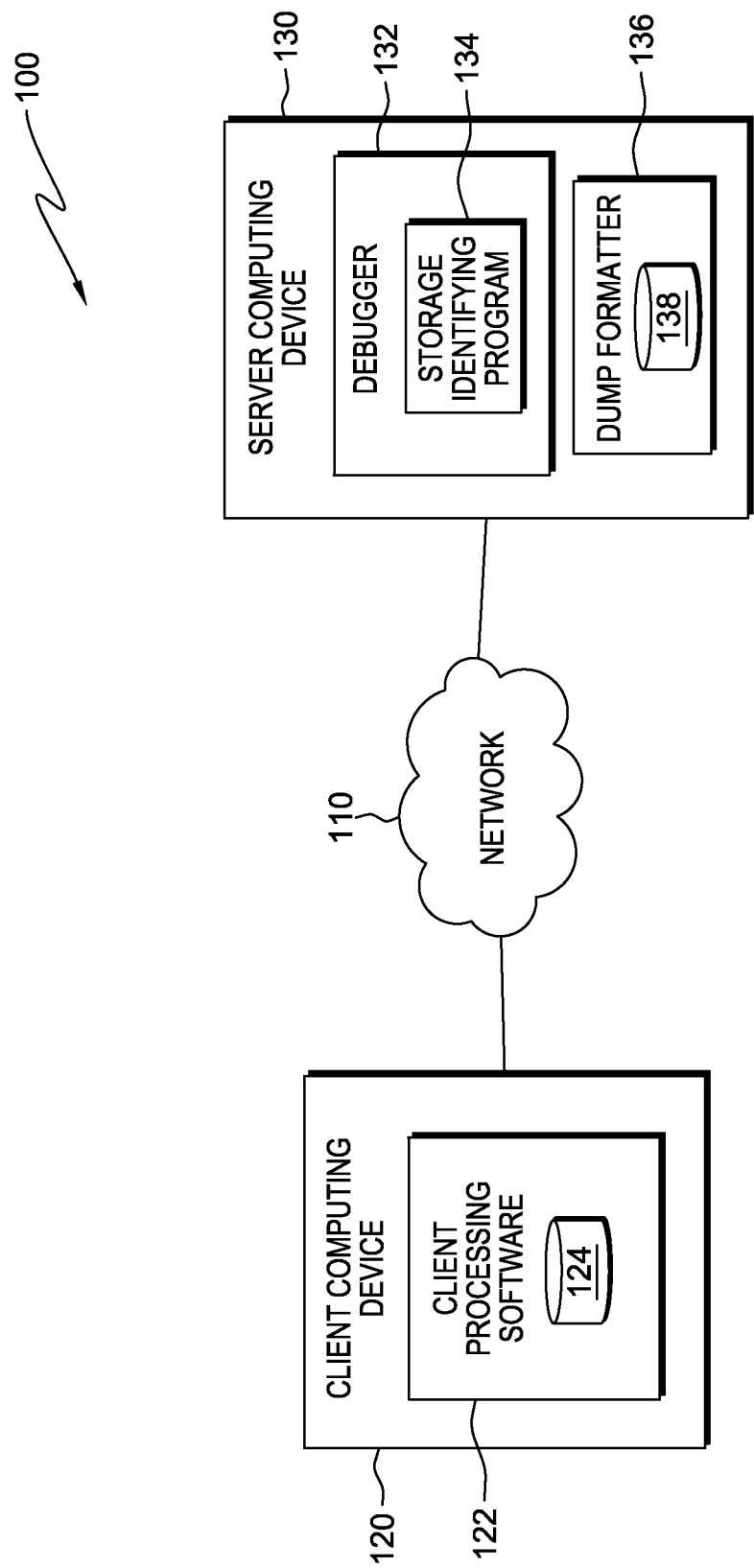
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

As will be appreciated by one skilled in the art, aspects of the present invention can be embodied as a method, computer system, or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer-readable storage medium(s) having computer readable program code/instructions embodied thereon.

Any combination of computer-readable storage media can be utilized. A computer-readable storage medium can be, for example, but not limited to, an electronic, magnetic, optical, or semiconductor system, apparatus, or device, or any suitable combination of the foregoing. More specific examples (a non-exhaustive list) of a computer-readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied can be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120 and server computing device 130, all interconnected over network 110. Network 110 can be, for example, a local area network (LAN), a wide area network (WAN) such as the internet, or a combination of the two, and can include wired, wireless, or fiber optic connections. In general, network 110 can be any combination of connections and protocols that will support communications between client computing device 120 and server computing device 130.

Client computing device 120 includes client processing software 122 and storage location 124. In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 130 via network 110. Client computing device 120 may include internal and external hardware components, as depicted and described in further detail with respect to FIG. 3.

Client processing software 122 can be any computer program, either system software or application software, running on a client device, for example, client computing device 120, that can contain a problem, or bug. In an exemplary embodiment of the present invention, client processing software 122 is capable of producing output files and reports containing evidence of the problem, called "dump files." Dump files can contain a log of recent events in client processing software 122, the state of memory at the time of the problem, and other useful diagnostic information provided by the computer program itself. The dump files are loaded into a dump formatter, for example, dump formatter 136 on server computing device 130, which converts the files into a form readable by a programmer or software engineer. Storage location 124 is the memory location containing data memory and storage for client processing software 122. In various embodiments of the present invention, storage location 124 may be located external to, and can communicate with, client processing software 122 via network 110.

Server computing device 130 includes debugger 132, storage identifying program 134, dump formatter 136, and storage location 138. Server computing device 130 can be a laptop computer, a tablet computer, a netbook computer, PC, a desktop computer, PDA, a smart phone, or any programmable electronic device capable of communicating with client computing device 120 via network 110, and with various components and devices within distributed data processing environment 100. In an exemplary embodiment of the present invention, server computing device 130 can represent a computing system utilizing clustered computers and components to act as a single pool of seamless resources when accessed through a network. This is a common implementation for data centers and for cloud computing applications, and can be utilized in a customer support environment, such that a programmer addressing customer computer problems operates on server computing device 130. Server computing device 130 may include internal and external hardware components, as depicted and described in further detail with respect to FIG. 3.

Debugger 132 can be any computer program or software tool used for testing and debugging another program. Debugging is a process to find and reduce, or resolve, problems and bugs in a computer program or a piece of electronic hardware. In an exemplary embodiment of the present invention, debugger 132 is a source level debugger (SLD), which allows a programmer to find and fix bugs in a computer program by showing the location of the bug in the program's original code. Debugger 132 may implement debugging using a command line interface (CLI) or a graphical user interface (GUI).

In the exemplary embodiment of the present invention, debugger 132 operates to debug dump formatter 136. Dump formatter 136 can be any software tool capable of converting data written by a computer program to a dump file, typically containing machine code (e.g., binary code), into a format able to be read and analyzed by a programmer. Storage location 138 is the memory location storing data memory and storage for dump formatter 136.

In the exemplary embodiment, when debugging a dump file in dump formatter 136, debugger 132 may request to view data at a storage location to aid in determining a problem and finding a solution. A request to view data at the storage location may include identifying the storage location by a storage address. The storage address for the storage location provided by dump formatter 136 links to a storage location within dump formatter 136, for example, storage location 138. However, the relevant storage location to help identify and solve the problem is located within the original program being formatted and debugged, such as storage location 124 in client processing software 122. Storage identifying program 134 determines the storage location being requested and directs the request to the relevant storage location.

Storage identifying program 134 identifies that a program being analyzed is addressing memory within a different storage location than the storage location of dump formatter 136 being analyzed by debugger 132. In the exemplary embodiment of the present invention, storage identifying program 134 operates within debugger 132 to intercept, or receive, storage address requests from the debugger and determine the relevant storage location being requested. While in FIG. 1, storage identifying program 134 is included within debugger 132, one of skill in the art will appreciate that in other embodiments, storage identifying program 134 may be located elsewhere within distributed data processing environment 100 and can communicate with debugger 132 via network 110.

Figure 2:
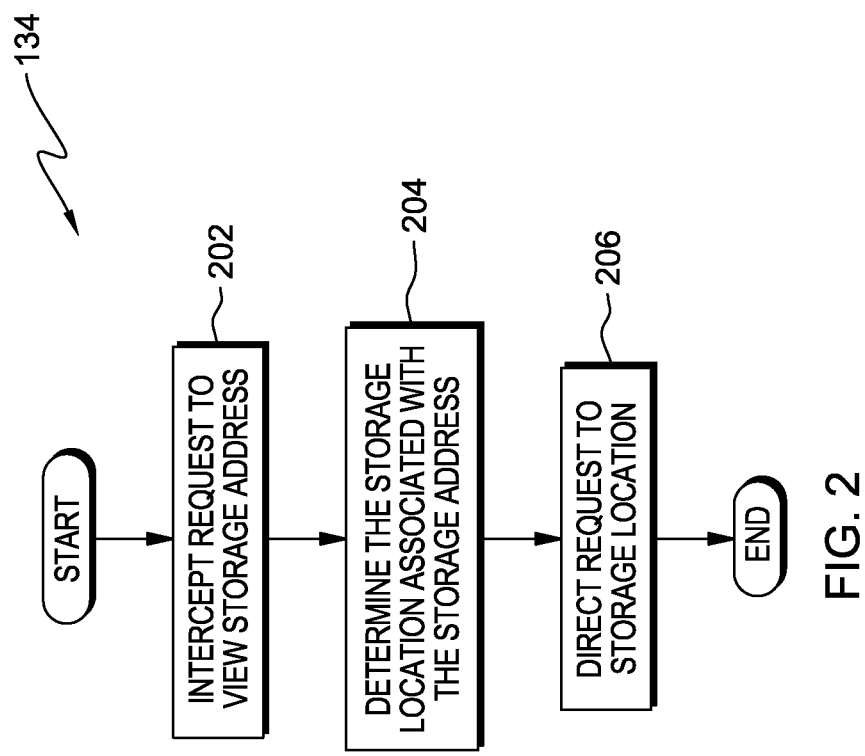
FIG. 2 is a flowchart depicting operational steps of a storage identifying program for identifying a requested storage address and redirecting the request to a relevant storage location, in accordance with an embodiment of the present invention.

FIG. 2 is a flowchart depicting operational steps of storage identifying program 134 for identifying a requested storage address and redirecting the request to a relevant storage location, in accordance with an embodiment of the present invention.

Storage identifying program 134 intercepts, or receives, requests to view a storage address (step 202). When debugging a dump file in dump formatter 136, debugger 132 may request to view a memory or storage location, identified by a storage address, in order to view data, browse memory locations or modify stored values. For example, a programmer on server computing device 130 running debugger 132 to debug dump formatter 136 can be analyzing a dump file from client processing software 122. The programmer may want to determine how a problem within dump formatter 136 handles data held in a certain part of a storage location associated with client processing software 122. Through debugger 132, a request can be made to view the data at the storage address.

Storage identifying program 134 determines the storage location associated with the requested storage address (step 204). When dump formatter 136 is executed to convert a dump file, the dump file itself is loaded into the dump formatter's storage location, for example, storage location 138 in server computing device 130. Therefore, a request from debugger 132 to view a storage address in dump formatter 136 will not display the relevant storage location for the dump file. The storage addresses found in the dump file are associated with memory contents and data in the originating program, for example, client processing software 122 data stored in storage location 124.

Storage identifying program 134 maintains data regarding memory loaded from the dump file into storage location 138 within dump formatter 136. In an exemplary embodiment of the present invention, storage identifying program 134 maintains the data in a table which maps storage addresses from storage location 124 to equivalent storage addresses in dump formatter 136 and storage location 138.

Storage identifying program 134 directs the request to the storage location (step 206). Storage identifying program 134, based on maintained data, directs the request to the relevant storage location, for example, storage location 124. In various embodiments of the present invention, a storage request may return and display the data from the relevant storage location on a user interface or viewing panel for the programmer to view.

Figure 3:
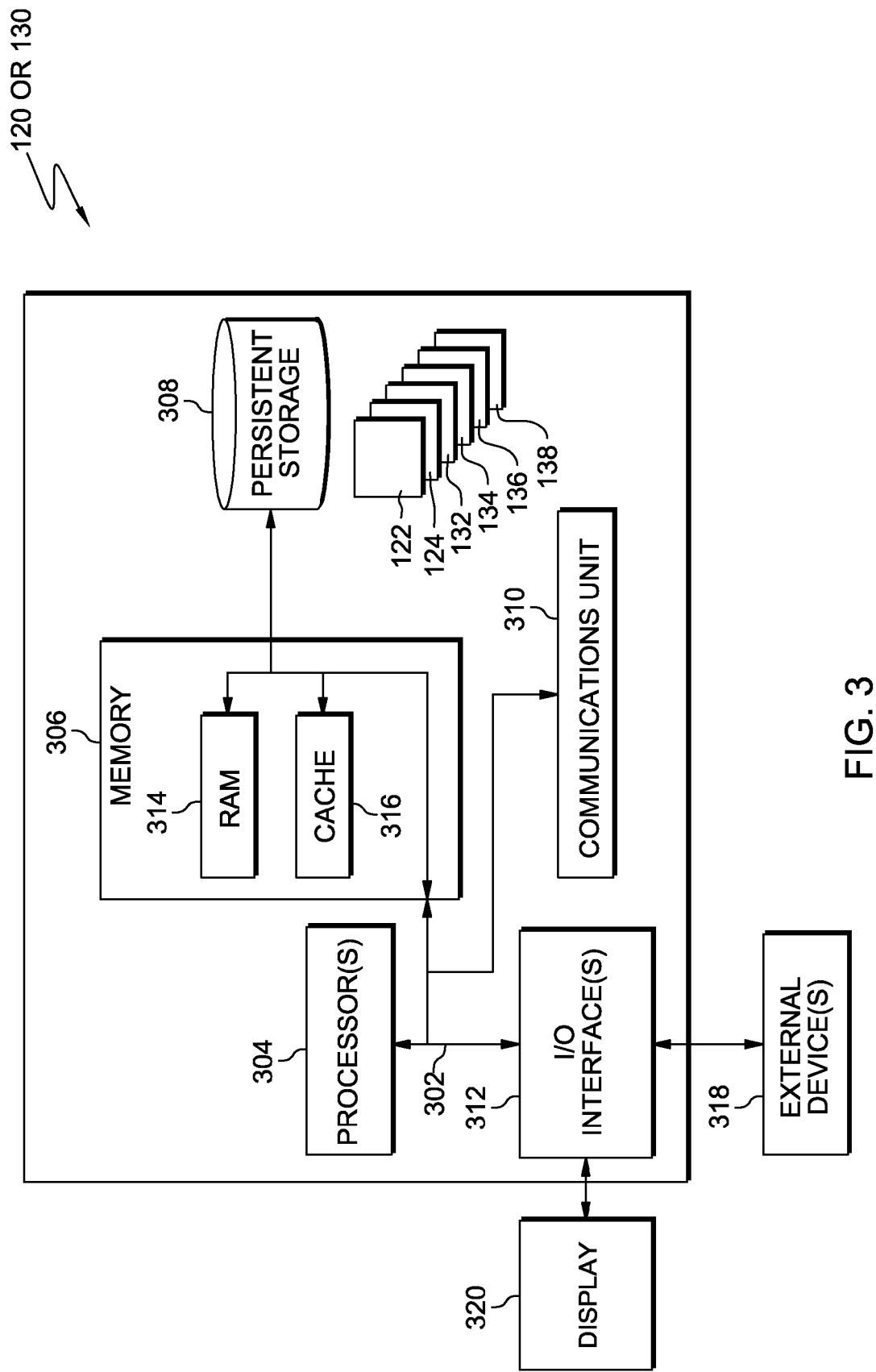
FIG. 3 depicts a block diagram of internal and external components of a data processing system, such as the server computing device or the client computing device of FIG. 1, in accordance with an embodiment of the present invention.

FIG. 3 depicts a block diagram of components of client computing device 120 or server computing device 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Client computing device 120 and server computing device 130 can include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Client processing software 122 and storage location 124 on client computing device 120, and debugger 132, storage identifying program 134, dump formatter 136, and storage location 138 on server computing device 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including between client computing device 120 and server computing device 130. In these examples, communications unit 310 includes one or more network interface cards. Communications unit 310 may provide communications through the use of either or both physical and wireless communications links. Client processing software 122, storage location 124, debugger 132, storage identifying program 134, dump formatter 136, and storage location 138 may be downloaded to persistent storage 308 through communications unit 310.

I/O interface(s) 312 allows for input and output of data with other devices that may be connected to client computing device 120 or server computing device 130. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., client processing software 122, storage location 124, debugger 132, storage identifying program 134, dump formatter 136, and storage location 138, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying a storage location for a requested storage address, the method comprising the steps of:
   receiving a request to view data at a storage address;
   determining, by one or more computer processors, the requested storage address corresponds to a plurality of storage locations, wherein the plurality of storage locations includes at least a storage location corresponding to an original program being debugged and a storage location corresponding to a dump formatter;
   determining, by the one or more computer processors, whether the requested storage address identifies memory related to a dump file being analyzed by the dump formatter;
   responsive to determining whether the requested storage address identifies memory related to a dump file being analyzed by the dump formatter, determining whether the requested storage address identifies the storage location of the plurality of storage locations corresponding to the dump formatter;
   responsive to determining the requested storage address identifies the storage location of the plurality of storage locations corresponding to the dump formatter, identifying the storage location of the plurality of storage locations corresponding to the original program being debugged; and
   directing the request to the identified storage location corresponding to the original program being debugged.

2. The method of claim 1, wherein the step of directing the request to the identified storage location further comprises displaying data from the identified storage location corresponding to the requested storage address.

3. The method of claim 1, wherein the step of identifying the storage location of the plurality of storage locations corresponding to the original program being debugged further comprises:
   determining, by the one or more computer processors, the original program created the dump file being analyzed by the dump formatter;
   determining, by the one or more computer processors, the requested storage address is equivalent to a storage address used by the original program; and
   requesting, from the original program, the storage location accessed by the original program for the equivalent storage address.

4. The method of claim 1, wherein the requested storage address corresponds to data, including memory and information for operation of a program, stored in a storage location.

5. The method of claim 1, wherein the step of determining whether the requested storage address identifies the storage location of the plurality of storage locations corresponding to the dump formatter further comprises:
   receiving the requested storage address from a debugger, wherein the debugger is debugging the dump formatter; and
   determining, by the one or more computer processors, the dump file was loaded into memory of the dump formatter.

6. A computer program product for identifying a storage location for a requested storage address, the computer program product comprising:
   one or more non-transitory computer-readable tangible storage media and program instructions stored on the one or more computer-readable tangible storage media, the program instructions comprising:
   program instructions to receive a request to view data at a storage address;
   program instructions to determine the requested storage address corresponds to a plurality of storage locations, wherein the plurality of storage locations includes at least a storage location corresponding to an original program being debugged and a storage location corresponding to a dump formatter;
   program instructions to determine whether the requested storage address identifies memory related to a dump file being analyzed by the dump formatter;
   responsive to determining whether the requested storage address identifies memory related to a dump file being analyzed by the dump formatter, program instructions to determine whether the requested storage address identifies the storage location of the plurality of storage locations corresponding to the dump formatter;
   responsive to determining the requested storage address identifies the storage location of the plurality of storage locations corresponding to the dump formatter, program instructions to identify the storage location of the plurality of storage locations corresponding to the original program being debugged; and
   program instructions to direct the request to the identified storage location corresponding to the original program being debugged.

7. The computer program product of claim 6, wherein program instructions to direct the request to the identified storage location further comprise program instructions to display data from the identified storage location corresponding to the requested storage address.

8. The computer program product of claim 6, wherein the program instructions to identify the storage location of the plurality of storage locations corresponding to the original program being debugged further comprise:
- program instructions to determine the original program created the dump file being analyzed by the dump formatter;
- program instructions to determine the requested storage address is equivalent to a storage address used by the original program; and
- program instructions to request, from the original program, the storage location accessed by the original program for the equivalent storage address.

9. The computer program product of claim 6, wherein the requested storage address corresponds to data, including memory and information for operation of a program, stored in a storage location.

10. The computer program product of claim 6, wherein the program instructions to determine whether the requested storage address identifies the storage location of the plurality of storage locations corresponding to the dump formatter further comprise:
- program instructions to receive the requested storage address from a debugger, wherein the debugger is debugging the dump formatter; and
- program instructions to determine the dump file was loaded into memory of the dump formatter.

11. A computer system for identifying a storage location for a requested storage address, the computer system comprising:
- one or more computer processors;
- one or more non-transitory computer-readable tangible storage media;
- program instructions stored on the one or more computer-readable tangible storage media for execution by at least one of the one or more computer processors, the program instructions comprising:
- program instructions to receive a request to view data at a storage address;
- program instructions to determine the requested storage address corresponds to a plurality of storage locations, wherein the plurality of storage locations includes at least a storage location corresponding to an original program being debugged and a storage location corresponding to a dump formatter;
- program instructions to determine whether the requested storage address identifies memory related to a dump file being analyzed by the dump formatter;
- responsive to determining whether the requested storage address identifies memory related to a dump file being analyzed by the dump formatter, program instructions to determine whether the requested storage address identifies the storage location of the plurality of storage locations corresponding to the dump formatter;
- responsive to determining the requested storage address identifies the storage location of the plurality of storage locations corresponding to the dump formatter, program instructions to identify the storage location of the plurality of storage locations corresponding to the original program being debugged; and
- program instructions to direct the request to the identified storage location corresponding to the original program being debugged.

12. The computer system of claim 11, wherein program instructions to direct the request to the identified storage location further comprise program instructions to display data from the identified storage location corresponding to the requested storage address.

13. The computer system of claim 11, wherein the program instructions to identify the storage location of the plurality of storage locations corresponding to the original program being debugged further comprise:
- program instructions to determine the original program created the dump file being analyzed by the dump formatter;
- program instructions to determine the requested storage address is equivalent to a storage address used by the original program; and
- program instructions to request, from the original program, the storage location accessed by the original program for the equivalent storage address.

14. The computer system of claim 11, wherein the requested storage address corresponds to data, including memory and information for operation of a program, stored in a storage location.

15. The computer system of claim 11, wherein the program instructions to determine whether the requested storage address identifies the storage location of the plurality of storage locations corresponding to the dump formatter further comprise:
- program instructions to receive the requested storage address from a debugger, wherein the debugger is debugging the dump formatter; and
- program instructions to determine the dump file was loaded into memory of the dump formatter.

16. The computer system of claim 11, wherein the program instructions to identify the storage location of the plurality of storage locations corresponding to the original program being debugged further comprise:
- program instructions to determine data regarding memory for the dump file was loaded into memory of the dump formatter; wherein the data is stored in a table mapping one or more storage addresses corresponding to the original program being debugged to equivalent one or more storage addresses corresponding to the dump formatter; and
- program instructions to identify an equivalent storage location of the one or more storage addresses corresponding to the original program being debugged based, at least in part, on the identified storage location of the plurality of storage locations corresponding to the dump formatter.

17. The computer system of claim 11, wherein the storage location corresponding to the original program being debugged and the storage location corresponding to the dump formatter are stored within at least two separate computing devices.

* * * * *